April 12, 1966     J. L. LORENZ     3,246,210
ICE LEVEL CONTROL CIRCUITRY
Filed May 9, 1963     2 Sheets-Sheet 1
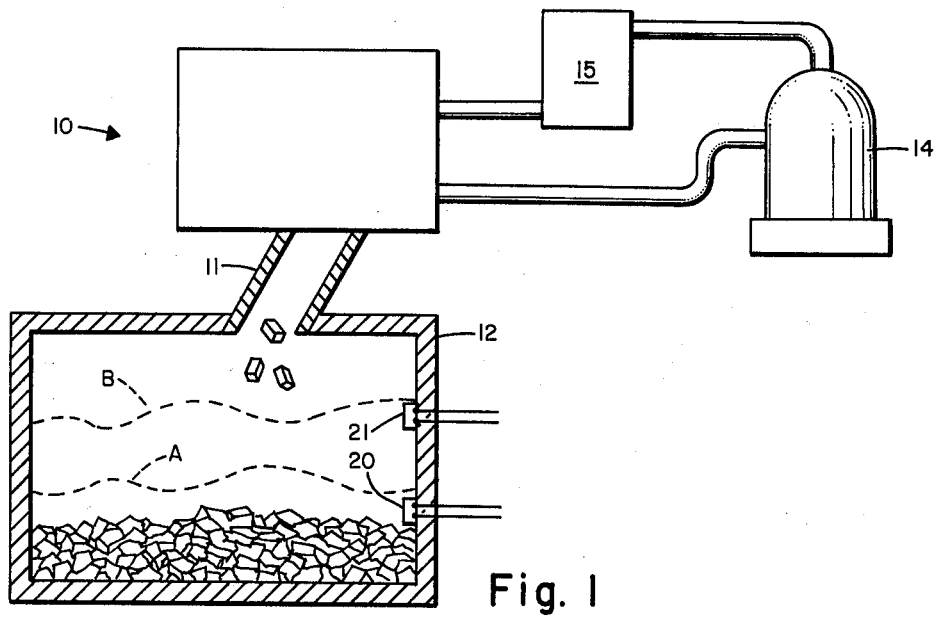
Fig. 1
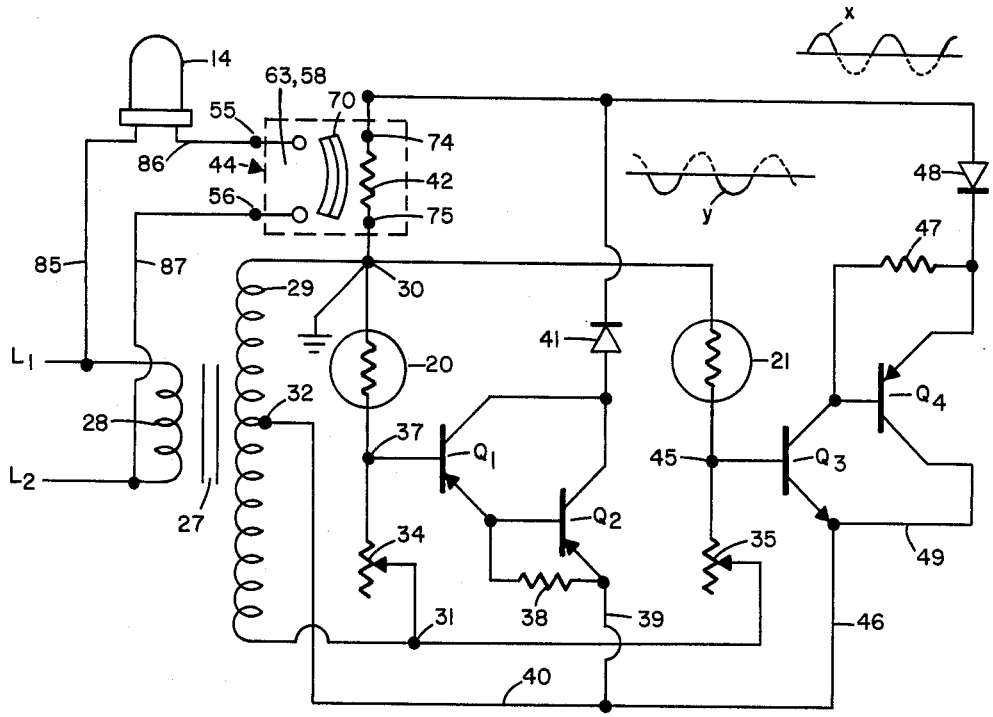
Fig. 2
INVENTOR.
JEROME L. LORENZ
BY 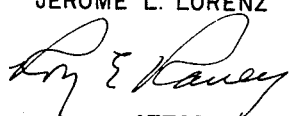
ATTORNEY April 12, 1966 J. L. LORENZ 3,246,210
ICE LEVEL CONTROL CIRCUITRY
Filed May 9, 1963 2 Sheets-Sheet 2

INVENTOR.
JEROME L. LORENZ
ATTORNEY

> United States Patent Office 3,246,210
Patented Apr. 12, 1966

3,246,210
ICE LEVEL CONTROL CIRCUITRY
Jerome L. Lorenz, Columbus, Ohio, assignor to Ranco Incorporated, Columbus, Ohio, a corporation of Ohio
Filed May 9, 1963, Ser. No. 279,236
9 Claims. (Cl. 317—156)

This invention relates to improvements in electrical control circuits suitable for controlling the operation of automatic ice making machines to maintain the quantity of ice in a storage bin between predetermined levels.

It is a primary object of this invention to provide an improved control circuit capable of performing the task of initiating the manufacture of ice when the level in a storage bin falls below a first predetermined level as a result of removal of ice from the bin or normal melt away of the ice, and which terminates the energization of the ice machine when the ice accumulates to a second level appreciably above the first mentioned level.

It is another object of this invention to provide a novel control circuit employing solid state components such as transistors and diodes in combination with a relay device which is bistable at half power for controlling the energization of the ice making machine so as to achieve the results mentioned in the foregoing paragraph.

As another object this invention aims to provide an improved ice level control circuit comprising first and second temperature sensing thermistors connected in first and second bridge circuits across a source of alternating current, and first and second amplifiers for producing first and second alternating current outputs corresponding to the temperatures at the first and second thermistors, and first and second diodes for effecting half wave rectification of each of the amplifier outputs but in opposite phase to one another, the rectified outputs being utilized to control actuation of a relay which is bistable at half power. That is to say, the output of one of the amplifiers alone is insufficient to actuate the relay, but the combined outputs of both amplifiers will actuate it and the relay will remain actuated although one of the outputs is terminated, and will be deactuated only when both of the rectified outputs are terminated.

Still another object of this invention is the provision, in a control circuit of the foregoing character, of a bistable thermal relay comprising a snap acting toggle switch and an electrically heated bimetal actuating arm, the relay being bistable at half power. In the preferred form of the thermal relay, the full power of both of the amplifier outputs is required to heat the bimetal sufficiently to actuate the toggle switch from a first to a second position, and after actuation the toggle spring aids the bimetal in maintaining the switch in the second position whereby upon termination of one of the amplifier outputs and heating of the bimetal by half power, the switch will remain stable in its actuated condition. Upon termination of both of the amplifier outputs so as to reduce the heating to zero power, the bimetal exerts a force to actuate the toggle from the second to the first position. Thereafter, the bimetal and toggle spring act together to hold the switch in the first position until the full power of both amplifiers is again utilized to heat the bimetal.

Other objects and advantages of this invention will become apparent from the following detailed description of a presently preferred form thereof read in conjunction with the accompanying sheets of drawings forming part of this specification, and in which—

FIG. 1 is a schematic illustration of an ice making machine and associated storage bin;

FIG. 2 is a diagrammatic illustration of an ice machine control circuit embodying the present invention.

Figure 3:
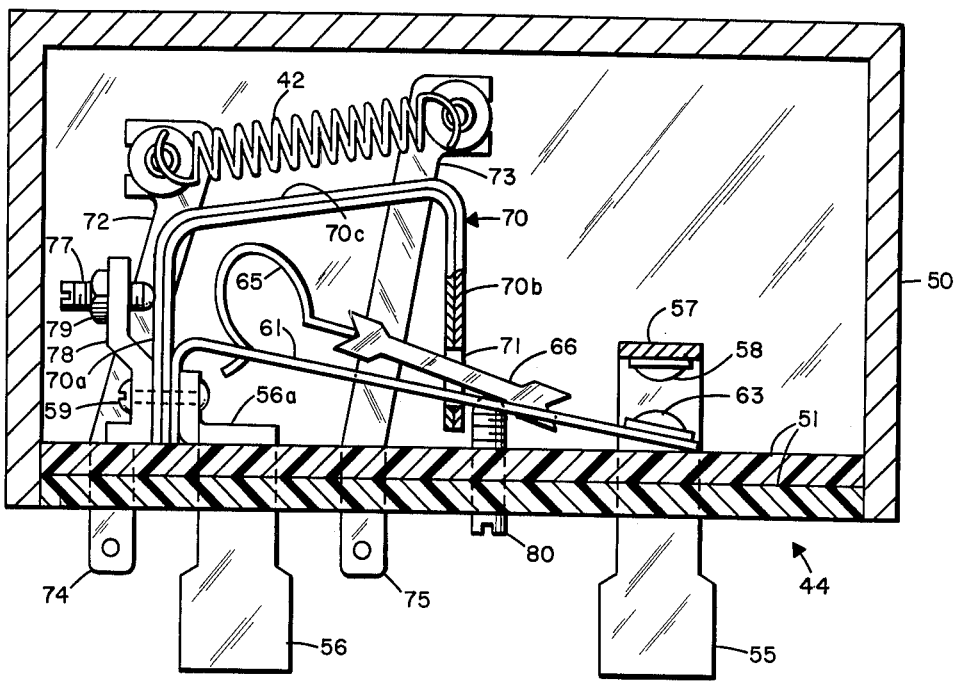
FIG. 3 is a vertical sectional view of a bistable at half power thermal relay forming part of the control circuit of FIG. 2.

In the drawings, there is shown an ice making machine 10 for manufacturing particulate ice, and having a chute 11 for discharging the ice into an ice bin 12 to be accumulated and stored. The ice machine 10 may be of any type well known in the art which may be electrically controlled, and in this instance comprises an electrically operated motor-compressor unit 14, a condenser 15 and an evaporator housed within the machine 10, all of which are connected by suitable tubing to form a conventional compressor-condenser expander circuit.

When the motor compressor unit 14 is energized, the ice machine 10 manufactures ice in particulate form, discharging it through the chute 11 and into the bin 12. The operation of the ice machine 10 is controlled, in accordance with this invention, to initiate the manufacture of ice whenever the level falls below a lower level A, as a result of removal of ice from the storage bin or as a result of normal melt-away, and operation of the ice machine is terminated upon accumulation of the ice in the bin above a second and higher level B. To this end, there are mounted in the bin 12 first and second temperature responsive resistors, or thermistors, 20 and 21 which form part of a control circuit 25 illustrated diagrammatically in FIG. 2.

Referring now to FIG. 2, the control circuit 25 comprises a voltage reducing transformer 27, the primary winding 28 of which is connected to power lines L1 and L2 leading to a suitable source of alternating electric current such as the usual 115 v. A.C. household current. The secondary winding 29 of the transformer 27 is provided with end terminals 30 and 31 and a center tap terminal 32. The thermistors 20 and 21 are connected in series with variable comparing resistors 34 and 35, respectively, between the transformer end terminals 30 and 31. The thermistor 20 and the comparing resistor 34 form ratio arms of a first bridge network including a first transistorized amplifier means comprising first and second transistors Q1 and Q2, while the thermistor 21 and the comparing resistor 35 form ratio arms of a second bridge network including a second transistorized amplifier means comprising third and fourth transistors Q3 and Q4.

In the present example the transistors Q1 and Q2 which form the amplifying means of the first bridge network are each of the PNP type arranged in common base and directly coupled configuration to provide a substantial current gain. Thus, the base of the transistor Q1 is connected to the junction 37 between the thermistor 20 and comparing resistor 34, while the emitter thereof is connected by a resistor 38 and conductors 39 and 40 to the center tap connection 32 to form the base emitter circuit while the collector is connected through a diode 41 and a resistance type heater 42 of a thermal relay 44 to the transformer terminal 30. The transistor Q2 has its base connected to the emitter of transistor Q1, its emitter connected by conductors 39 and 40 to center tap connection 32, and its collector connected to the transformer terminal 30 through the diode 41 and relay heater 42 to complete the first bridge network.

The transistors Q3 and Q4 which form the amplifying means of the second bridge network are of the NPN and PNP types, respectively, arranged in common base directly coupled complementary configuration. Thus, the base of transistor Q3 is connected to the junction 45 between thermistor 21 and the comparing resistor 35, while the emitter is connected by conductors 46 and 40 to the center tap 32, and the collector is connected through a resistor 47, a diode 48, and relay heater 42 to the transformer terminal 30. The base of the transistor Q4 is connected to the collector of the transistor Q3 while the collector of transistor Q4 is connected by wires 49, 46, and 40 to the center tap 32. The emitter of the transistor Q4 is connected through the diode 48 and the relay heater 42 to the transformer terminal 30 to complete the second bridge network.

The half-power bistable relay 44, best illustrated in FIGS. 3 and 4 and described more fully hereinafter, comprises a housing 50 including a base member 51 of laminated insulating material. Front and rear terminals 55 and 56 are formed of brass or the like and extend through the base 51 with the front terminal 55 formed to provide a U-shaped portion 57 in which is secured a stationary contact 58. Secured to the inner end 56a of the terminal 56, as by a rivet 59, is the down-turned end of leaf spring 61 which carries at its outer end a movable contact 63 which is adapted to be moved into and out of engagement with contact 58 to make and break an electric circuit through terminals 55 and 56.

The movable contact arm 61 has an elongated central opening in which is disposed a snap-acting or over-center toggle mechanism including a C-shaped spring 65 and a toggle bar 66. The toggle bar 66 is formed with V-shaped notches at opposite ends thereof, one of which is pivotally engaged with the movable arm 61 adjacent the contact 58, and the other of which pivotally receives one end of the C-shaped spring 65. The other end of the C-shaped spring is pivotally engaged with the contact arm 61 adjacent the fixed end thereof.

A U-shaped bimetal actuating arm 70 has the end of one leg 70a thereof secured by rivet 59 to the inner end 56a of terminal member 56 and has an opening 71 in the leg 70b thereof receiving the toggle bar 66. The bight portion 70c of the bimetal arm 70 is disposed adjacent the resistance type heater element 42 which is conveniently in the form of a helical coil supported at opposite ends by suitable conductor members 72 and 73 which extend through the base 51 and terminate in terminal elements 74 and 75.

The bimetal arm 70 normally tends to raise the toggle bar 66 away from the base 51 and is limited in movement in this direction by an adjustable stop screw 77 which extends through a threaded support member 78 and is secured in its adjusted position by a lock nut 79. The bimetal arm 70 has its side having the greater coefficient of expansion facing the heater 42 so that upon energization of the heater 42 the leg 70b will move downwardly and rotate toggle bar 66 about an adjustable pivot screw 80 extending upwardly through the base member 51 and engaging the lower side of the toggle bar.

When the heater 42 is subjected to sufficient current flow to cause the toggle bar 66 to be rotated in a counterclockwise direction as viewed in FIG. 3 so that the pivotal connection between the C-shaped spring 65 and the toggle bar 66 passes beyond its dead-center position with respect to the contact arm 61, the latter is driven upwardly by the spring 65 to bring the contact 63 smartly into engagement with the fixed contact 58. Conversely, when the heater 42 is allowed to cool, the bimetal 70 rotates the toggle bar 66 in a clockwise direction until the spring 65 and the toggle member pass upwardly through their dead-center position with respect to the arm 61, the latter thereupon being driven downwardly to separate the movable contact 63 from the fixed contact 58. When the relay contacts 63, 58 are closed, a circuit may be traced from line L, through a conductor 85, motor compressor 14, a conductor 86, relay terminals 55 and 56, and a conductor 87 to line L2.

It will be recognized that the over-center toggle action of the spring 65 and toggle bar 66 tends to hold the contacts in either the open or the closed position so that it is necessary for the bimetal member 70 to exert a downward force to close the switch and an upward force to open the switch.

Figure 4:
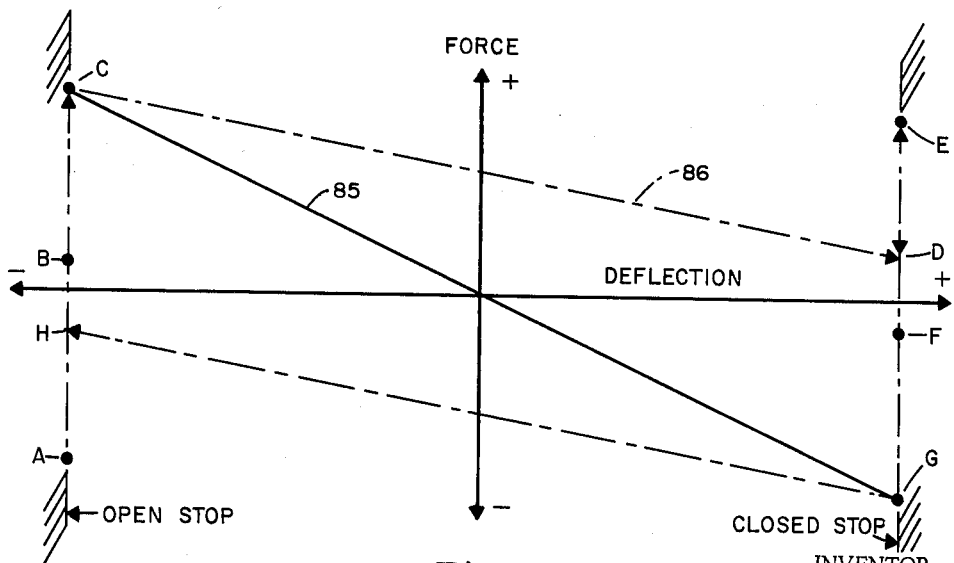
FIG. 4 is a graphical illustration of the force and deflection parameters of the relay of FIG. 3.

Referring now to FIG. 4 in which the vertical axis represents force and the horizontal axis represents deflection, the force and deflection characteristics of the toggle spring 65 on the movable contact are denoted by a full line curve 85, while the force and deflection characteristics of the bimetal member 70 are denoted by the dot and dash line curve 86. Starting at point A with the relay fully deenergized, the deflection of the bimetal, the toggle spring, and the movable contact will be limited by engagement of the free end of arm 61 with the base 51 which may be referred to as an open stop. Upon half power energization of the heater 42, the force exerted by the bimetal 70 downwardly against the toggle spring will increase as indicated by dot and dash line from A to B but will be insufficient to effect movement of the toggle and hence at half power the switch will remain stable on the open stop.

Upon full power energization of the heater 42 the force of bimetal 70 will increase going from B to C in FIG. 4. When the force of the bimetal equals the force of the toggle spring at point C, the toggle spring force degenerates with acceleration toward zero as indicated by the full line 85, at which point the toggle spring drives the movable contact toward the fixed contact 58 with increasing force until the deflection is limited by the fixed contact which serves as the closed stop. This movement is accompanied by an expenditure of energy by the bimetal member 70 and decrease in force thereof as indicated by the slope of the dot and dash line 86 from C to D. Thereafter, continued full power energization of the heater results in an increase of force in the bimetal member 70 from D to an equilibrium condition at E without further deflection.

Reduction of energization of the heater 42 from full power to half power will effect a corresponding reduction in force of the bimetal 70 from point E to point F without any change in deflection of the toggle, whereby it can be seen that the relay is also stable in the closed operative position when energized at half power. Upon complete deenergization of the heater 42 to zero power, the bimetal 70 will cool and exert an increasing force from F to G at which point the force of the toggle spring 65 will be overcome and will rapidly accelerate toward zero as indicated by the full line curve 85, at which point the toggle spring will drive the movable contact from the closed stop position to its open stop position with an increase in force. This movement of the toggle spring and movable contact is accompanied by movement of the bimetal 70 and expenditure of energy thereby resulting in a reduction of force by the bimetal as indicated by the sloping dotted line from G to H. Thereafter, as the bimetal 70 cools to an equilibrium condition the force exerted thereby will increase as represented from H to A without any further deflection.

In setting up the control device of this invention, the comparing resistors 34 and 35 are adjusted so that when the thermistors 20 and 21 are covered with ice in the bin, the first and second transistor amplifiers are biased off. In this condition, the heater 42 of relay 44 is deenergized and the relay contacts are open so that the motor compressor 14 of the ice machine is idle. Thereafter, if ice is removed from the bin to lower the ice level below level B but above level A, the thermistor 21 will increase in temperature due to heat leakage into the ice bin and a small amount of self heat. As the temperature of the thermistor 21 rises its resistance correspondingly decreases so that during that half cycle of the transformer 27 when the terminal 30 is positive, the base of the transistor Q3 will go correspondingly more positive with respect to the emitter, thereby forward biasing the transistor Q3 into a conductive state.

The increased conductivity of the emitter-collector circuit of transistor Q3 causes an increased voltage drop across resistor 47 and a corresponding reduction in voltage of the base of transistor Q4 with respect to its emitter, thereby forward biasing the transistor into conductivity through the emitter-collector circuit thereof. Thus, during the half cycle when the transformer terminal 30 is positive with respect to the center tap 32, a substantial flow of current may be traced from the terminal 32 through conductors 40, 46, 49, the collector and emitter of transistor Q4, diode 48, and relay heater 42 to the transformer terminal 30.

During the other half cycles when terminal 30 is negative with respect to the center tap 32 and terminal 31, and when the thermistor 21 is free of ice and hence of lowered resistance, and the transistors Q3 and Q4 become reverse biased, the diode 48 prevents electron current flow through the collector-emitter circuits of transistors Q3 and Q4. The diode 48 thereby protects the transistors against reverse polarity damage and cooperates with the transistors to produce a rectified or half-wave output as shown at x in FIG. 2. The half-wave output x effects half power heating of the heater 42 of relay 44, and produces insufficient downward force by bimetal arm 70 to actuate the relay which remains in its unactuated or contacts open condition.

When the level of the ice in the bin 12 falls below the lower level A, either by normal melt-away or upon removal of ice therefrom, so as to free the thermistor 20 of ice, the thermistor 20 increases in temperature and undergoes a corresponding reduction in resistance. During those half cycles when the transformer terminal 30 is negative with respect to the center tap and the terminal 31, the lowered resistance of thermistor 20 results in an increase in forward bias of the base-emitter circuit of transistor Q1, thereby resulting in an electron current flow which may be traced from the transformer terminal 30 through relay heater 42, diode 41, the collector and emitter of transistor Q1, resistor 38, and conductors 39 and 40 to the center tap connection 32.

The current flow through the resistor 38 results in an increased forward bias between the base and emitter of transistor Q2 and a corresponding increase in conductivity between the collector and emitter thereof. This increased conductivity results in a substantial current flow from the transformer terminal 30 through the relay heater 42, the diode 41, the transistor Q2 and conductors 39 and 40 to the center tap connection 32 during those half cycles when the transformer terminal 30 is negative with respect to the terminals 32 and 31. During those half cycles when the transformer terminal 30 is positive with respect to the terminals 32 and 31, the diode 41 prevents any appreciable current flow in the opposite direction, thereby resulting in a rectified or half-wave negative current output indicated at y.

It will be recognized that the half-wave output current y when added to the half-wave output current x will result in a full wave current passing through the relay heater 42. When this occurs, the heater 42 heats the bimetal member 70 of the relay 44 sufficiently to close the contacts 63, 58 and energize the motor compressor 14 to initiate the production of ice by machine 10.

As the ice accumulates and the level thereof rises above the level A, the thermistor 20 is cooled thereby and the resistance thereof increases until the forward bias on the base emitter circuit of transistor Q1 is reduced sufficiently to shut off the current flow through resistor 38. This in turn reduces the forward bias between the base and emitter of transistor Q2, thereby shutting off the current flow through transistor Q2 and hence ending the half wave current output y. The current available to energize the relay heater 42 is thereby reduced to half power as represented by the half wave current output x of the second transistorized amplifier section controlled by the thermistor 21. Since the relay 44 is bistable at half power, that is to say the upward force of bimetal arm 70 when heated by output x alone, is insufficient to deactuate the relay which remains in its contacts closed position thereby continuing the operation of the ice machine 10.

When the ice accumulates above the level B so as to cover the thermistor 21, the latter is cooled and undergoes a corresponding increase in resistance so as to reduce the forward bias beyond the cut-off point of transistor Q3. The cut-off of transistor Q3 substantially eliminates current flow through resistor 47 thereby reducing the forward bias of transistor Q4 beyond its cut-off point so as to eliminate the half wave current output x. The loss of the half wave output x reduces to zero the power being converted to heat by the heater 42 of relay 44, thereby permitting the bimetal 70 to cool and exert sufficient upward force to actuate the contacts 63, 58 to their open condition so as to terminate the energization of the motor compressor 14 and operation of the ice machine 10.

From the foregoing detailed description of a presently preferred embodiment of this invention it will be appreciated that there has been provided thereby a unique and effective electronic control means for an ice making machine, which control means establishes an appreciable differential between the lower ice level at which the ice machine operation is initiated and the upper ice level at which the machine operation is terminated so as to eliminate excessive cycling of the ice machine due to normal melt away or the removal of small quantities of ice from the storage bin. It will also be appreciated that this invention accomplishes the foregoing in a new and improved manner through the use of circuitry employing solid state components in combination with a bistable electric relay. It will further be appreciated that the control apparatus of this invention will be substantially free of ambient pressure and temperature effects and free of mechanical problems due to corrosion and frost. In this regard, the use of a heated bimetal type relay such as relay 44 maintains the relay in a dry and operative condition.

Although certain preferred arrangements of transistor amplifier circuitry and a preferred form of bistable relay have been shown, other configurations of solid state circuitry and other half power bistable electrical relays than the heated bimetal type could be used without departing from the spirit of the invention.

Accordingly, although the invention has been described in considerable detail with reference to a specific control circuit, it is understood that the invention is not limited thereto, but rather the invention includes all those changes, modifications, substitutions, adaptations, and uses as are reasonably embraced by the scope of the claims hereof.

Having thus described my invention, I claim:
1. A thermally responsive control circuit comprising:
   (a) an alternating current transformer including a secondary winding having a center tap,
   (b) a first bridge circuit including a first junction between a first resistor and having a first thermistor connected in series across said secondary winding,
   (c) a second bridge circuit including a second junction between a second resistor and a second thermistor connected in series across said secondary winding,
   (d) a first amplifier connected to compare the voltage of said first junction to said center tap so as to provide an alternating output current corresponding to the temperature at said first thermistor,
   (e) a second amplifier connected to compare the voltage of said second junction to said center tap, so as to provide alternating output current corresponding to the temperature at said second thermistor,
   (f) a first diode for affecting half wave rectification of the output of said first amplifier,
   (g) a second diode for effecting half wave rectification of the output of said second amplifier and in opposite phase to the rectified output of the first amplifier,
   and
   (h) an electric relay including electrically energized power means connected to the rectified output of said first and second amplifiers, (i) said relay being actuable between first and second operative positions upon energization of the power means thereof by the combined output power of both of said amplifiers, said relay being bistable at less than the said combined output power.

2. A control circuit as defined in claim 1 and wherein said relay is actuable between said second and first operative positions only upon the combined termination of the outputs of both of said amplifiers.

3. A thermally responsive bistable control circuit comprising:
(a) an alternating current transformer including a secondary winding having a center tap,
(b) a first bridge circuit including a first junction between a first resistor and a first thermistor connected in series across said secondary winding,
(c) a second bridge circuit including a second junction between a second resistor and a second thermistor connected in series across said secondary winding,
(d) a first amplifier connected to compare the voltage of said first junction to said center tap so as to provide an alternating output current corresponding to temperature changes at said first thermistor,
(e) a second amplifier connected to compare the voltage of said second junction to said center tap so as to provide an alternating output current corresponding to temperature changes at said second thermistor,
(f) a first diode for effecting half wave rectification of the output of said first amplifier,
(g) a second diode for effecting half wave rectification of the output of said second amplifier and in opposite phase to the rectified output of the first amplifier, and
(h) a thermo-electric relay including a resistance heater connected to the rectified output of said first and second amplifiers,
(i) said relay being actuable between first and second operative positions upon energization of said heater by the combined output power of both of said amplifiers, and being bistable at less than said combined output power.

4. A thermally responsive control circuit comprising:
(a) an alternating current source having a center tap,
(b) a first bridge circuit including a first junction between a first resistor and a first thermistor connected in series across said current source,
(c) a second bridge circuit including a second junction between a second resistor and a second thermistor connected in series across said current source,
(d) first amplifier means comprising a first transistor having its base connected to said first junction and its emitter connected to said center tap, so as to be biased into conductive state upon increase in temperature at said first thermistor above a predetermined temperature,
(e) second amplifier means comprising a second transistor, which is complementary in type to said first transistor, said second transistor having its base connected to said second junction and its emitter connected to said center tap so as to be biased into conductive state upon increase in temperature at said second thermistor above said predetermined temperature,
(f) first and second rectifiers connected to the collectors of said first and second transistors and oriented for providing half wave rectification of the output of each transistor in opposite phase to one another, and
(g) a bistable relay connected between said rectifiers and said current source so as to be energized by the rectified outputs of said transistors,
(h) said bistable relay being operative between first and second control positions only by the combined outputs of said first and second transistors.

5. A thermally responsive control circuit as defined in claim 4 and wherein said first and second amplifier means comprise third and fourth transistors connected in direct coupled relation to said first and second transistors respectively.

6. A thermally responsive control circuit as defined in claim 4 and wherein said first and second resistors are variable to select first and second predetermined temperatures at which said first and second transistors will be biased into their conductive states.

7. A thermally responsive control circuit as defined in claim 4 and wherein said bistable relay comprises a resistance heater connected for energization by the outputs of said first and second amplifiers, a bimetal element disposed adjacent said heater, and a snap acting switch having first and second operative positions, said bimetal element being responsive to energization of said heater by the outputs of both said amplifiers to actuate said switch from said first to said second operative position, said bimetal element being responsive to deenergization of said heater by both of said amplifiers to actuate said switch from said second to said first operative position, and said bimetal element being ineffective to actuate said switch in response to energization of said heater by only one of said amplifiers.

8. A control circuit for maintaining a condition between first and second limits comprising:
(a) means establishing a control circuit including a source of alternating current having current flow in opposite waves,
(b) a first condition responsive means to control the passage of the waves of one direction of said alternating current in response to the presence of one of said condition limits,
(c) a second condition responsive means to control the passage of the waves of the opposite direction of said alternating current in response to the presence of the other of said condition limits,
(d) means providing a power circuit having a current flow value proportional to said waves passed by said first and second condition responsive means,
(e) an electric switch movable between two circuit controlling positions and including an electro responsive power means responsive to the flow of current in said power circuit resulting from the passage of the waves of both directions by said condition responsive means to move said switch from one control position to the other and responsive to the reduction in current flow resulting from cessation of passage of said waves by said condition responsive means to move said switch from said second control position to said first control position,
(f) and means to prevent said power means from moving said switch from one of said control positions to the other when said power means is energized by current in said power circuit resulting from the passage of waves of only one direction by said condition responsive means.

9. A control circuit for maintaining a condition between first and second limits comprising:
(a) means establishing a control circuit including a source of alternating current having current flow in opposite waves,
(b) a first condition responsive means to control the passage of the waves of one direction of said alternating current in response to the presence of one of said condition limits,
(c) a second condition responsive means to control the passage of the waves of the opposite direction of said alternating current in response to the presence of the other of said condition limits,
(d) means providing a power circuit having a current flow value proportional to said waves passed by said first and second condition responsive means,
(e) an electric switch movable between two circuit controlling positions and including an electro responsive power means responsive to the flow of current in said power circuit resulting from the passage of the waves of both directions by said condition responsive means to move said switch from one control position to the other and responsive to the reduction in current flow resulting from cessation of passage of said waves by said condition responsive means to move said switch from said second control position to said first control position, (f) and means to prevent said power means from moving said switch from either of said controlling positions when energized by current in said power circuit resulting from the passage of waves of only one direction by said condition responsive means.

References Cited by the Examiner

UNITED STATES PATENTS

| Re. 24,268 | 1/1957 | Zuckerman | 200—122 |
| 2,521,277 | 9/1950 | Aubert | 200—67 |
| 2,766,406 | 10/1956 | Schwarzkopf | 317—135 X |
| 2,963,885 | 12/1960 | Loewenthal | 62—137 X |
| 2,972,685 | 2/1961 | Baude. | |
| 3,118,087 | 1/1964 | Eisenberg | 317—123 |
| 3,159,824 | 12/1964 | Boddy | 317—132 X |

SAMUEL BERNSTEIN, *Primary Examiner.*

R. A. O'LEARY, *Examiner.*

R. E. BACKUS, L. T. HIX, *Assistant Examiners.*